Oct. 1, 1968　　　A. J. KIDNEY ET AL　　　3,403,453
METHOD OF MAKING EDIBLE TUBULAR PRODUCTS

Filed Dec. 16, 1966　　　3 Sheets-Sheet 1

INVENTORS.
ALLAN JAMES KIDNEY,
MAXWELL CHARLES HAMLYN &
ALEXANDER OWEN,
BY Brumbaugh, Free,
Graves & Donohue
their ATTORNEYS.

(a)

(b)

(c)

3,403,453
**METHOD OF MAKING EDIBLE
TUBULAR PRODUCTS**
Allan James Kidney, London, Maxwell Charles Hamlyn, Kingston-on-Thames, and Alexander Owen, London, England, assignors to Unilever Limited, Port Sunlight, England, a company of Great Britain
Filed Dec. 16, 1966, Ser. No. 602,365
Claims priority, application Great Britain, Jan. 3, 1966, 189/66
3 Claims. (Cl. 34—21)

ABSTRACT OF THE DISCLOSURE

The invention relates to the processing of sausage casing and the like. Natural or artificial casing, which tends to be fragile and difficult to handle while wet, is supported during processing, drying and shirring by a rod- or tube-like templet introduced into the lumen of the casing. In this way handling is facilitated and a uniform casing results. The templet is preferably an inflated tube of plastics material.

---

Figure 1:
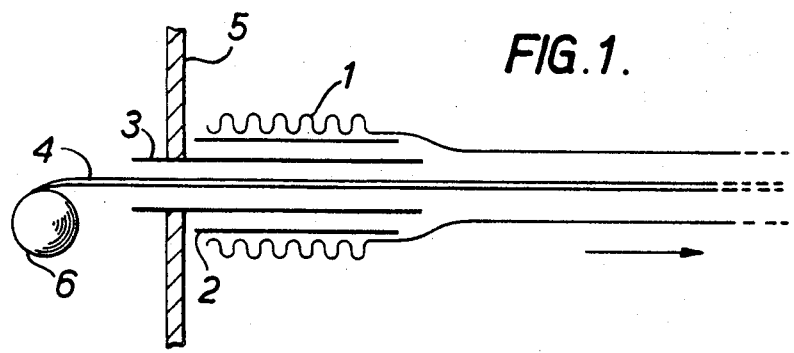

This invention relates to the processing of flexible tubular casings, particularly sausage casings.

Flexible tubular products, for example natural or artificial sausage casings, are often inconvenient to handle during processing. In particular they are often very fragile, especially when wet, so that care may have to be taken to avoid subjecting them to stresses which could lead to rupture or breakage.

A further problem which faces the manufacturer of both natural and synthetic sausage casings, is the difficulty of obtaining a dried product having substantially uniform diameter. Thus the sausage manufacturer, in order to make large numbers of sausages each having similar dimensions, will generally reject portions of casing which have a diameter outside a permitted tolerance. It would therefore be a considerable commercial advantage to be able to process natural casings or to manufacture artificial casings which when dried have a diameter which falls within such a tolerance.

We have now found that it is possible both to provide adequate support for fragile wet casings during such process treatments as are necessary before obtaining a dried casing suitable for sausage manufacture, and to provide a means for controlling the diameter of the casing when dried.

In the process to be described hereinafter, reference is made only to sausage casings, but the process can obviously be employed in the processing of other tubular casings, for example casings employed in the medical field, which may advantageously be supported during process in the manner to be described.

Accordingly, the invention provides a process for treating a flexible tubular casing, which process comprises the steps of disposing the casing on a rod- or tube-shaped templet, and subjecting the tubular casing to a drying treatment while disposed on the templet so that the tubular product when dried conforms to the outer surface of the templet.

By a templet we mean a rod- or tube-like support for insertion within the lumen of the casing, the templet being either rigid or flexible, and having an outer diameter adjustable if necessary, which can determine the internal diameter of the casing when dry.

The templet may alternatively be a rod or tube of resilient material having a longitudinal split extending throughout at least part of its length, so as to provide for the casing an adjustable support the external dimension of which may be varied by opening or closing the longitudinal split.

In the process according to the invention, the casing is disposed on the templet in any suitable manner, and is thus supported by the templet during subsequent process treatments, for example, dipping in or spraying with liquids, drying, rewetting or washing, as are necessary, until the casing is finally dried while still carried on and supported by the templet.

When the casing to be processed is of the type which shrinks on drying, the outer dimension of the templet should be slightly smaller than the internal dimension of the wet casing when extended, so as to permit the casing to shrink onto the templet when the casing is subjected to a drying treatment.

When, however, the casing is of a type which exhibits little or no shrinking properties when drying, the templet should suitably be of a type, for example an inflatable tube or a split rod or tube of resilient material, which is capable of adjustment so that its external dimensions determine the internal dimensions of the casing after the drying treatment.

It has been found that wet casing, either natural or artificial, can be processed in this way although it may be desirable to strengthen the casing, for example by application of cross-linking agents, to reduce the likelihood of mechanical damage to it while it is being handled. The casing treated according to our co-pending U.S.A. patent application No. 556,849, filed on June 13, 1966, have been processed according to this invention with particular success.

Various techniques may be employed in order to dispose the casing on the templet, while the casing is in a wet and therefore possibly fragile condition, and subsequently to remove the dried casing from the templet. A few such techniques are now described by way of illustration.

According to one embodiment of the invention illustrating the use of a rigid templet, the wet casing may be slid onto the rigid templet in the form of a rod or tube having an outer diameter slightly less than that of the casing, and the casing subsequently treated and then dried while supported on the templet, so that by shrinkage the casing when dried conforms to the outer surface of the templet. Preferably the surface of the templet is of a material having a low coefficient of friction to facilitate sliding the casing thereon and shirring therefrom when the casing has been dried. Polytetrafluorethylene is a convenient example of such "low friction" material which has proved to be particularly suitable.

In a preferred method according to the invention, it has been found advantageous to employ as the templet an inflated tube of suitable material, for example nylon or polyethylene. The material of the outer surface of the tube, which when inflated contacts the casing, should preferably have a low coefficient of friction so as to facilitate removal of the casing from the tube when subjected to a final drying treatment. The casing may be disposed upon an inflated or partially inflated tube, or the tube in an uninflated state may be introduced into the lumen of the casing, and subsequently inflated to the required diameter. The outer diameter of the tube when inflated is suitably the same as the internal diameter of the dried casing, although when the casing is of a type which tends to shrink during drying, it may be preferable for the tube to be slightly narrower than the casing so as to allow for such shrinkage.

Sausage casings are generally shirred before being stuffed with sausage meat, and when the casing has been subjected to a drying treatment on the templet, we have found it convenient to shir the casing directly from the templet. This may be done, for example by passing the templet through an aperture which is too small to allow passage of the casing as well as the templet, so that in consequence the casing is gathered into a tightly shirred form at one side of the aperture.

To illustrate one embodiment of the preferred method according to the invention, a length of natural sheep gut sausage casing was wet shirred by hand onto a short length of rigid polytetrafluorethylene tube. The end of a length of inflated plastics tubing was passed through the bore of this polytetrafluorethylene tube, and the casing and the plastics tubing were then drawn away from the polytetrafluorethylene tube at the same rate, so that the plastics tube was eventually disposed inside the extended casing throughout its length, the plastics tubing protruding from each end of the casing. The plastics tube was then inflated to the required diameter and sealed.

The casing was then suitably supported on the inflated tube for further treatment as required and for final subjection to a drying treatment, for example by being suspended while supported on the inflated tube in a warm room. The dried casing could then be shirred directly from the inflated tube as described earlier or, the tube could be deflated, for example by puncturing it and then withdrawing it from the lumen of the casing in the deflated form.

In a further embodiment of this preferred aspect of the invention, the wet casing was shirred onto a short polytetrafluorethylene tube and one end of a length of plastics tubing about 8 m. in length was then sealed at one end, the tubing inflated to the desired diameter and sealed at about 60 cm. from the open end of the tube. The inflated end of the tube was then passed into the bore of the polytetrafluorethylene tube and pulled through so that the inflated part of the tube was compressed as it passed into the polytetrafluorethylene tube, and allowed to inflate again as it left the tube. The tubing was pulled through the polytetrafluorethylene tube at the same rate as the casing was wihdrawn from around he outside of the polytetrafluorethylene tube, the extended casing thus being disposed around the inflated plastics tube. The supported casing was then subjected to further treatment as required.

In a further embodiment of this preferred aspect of the invention, which is applicable to the production of manufactured sausage casings by extrusion, a plastics tube was fed through the centre of the nozzle from which the casing was being extruded, and the tube drawn through the nozzle at the same rate as that at which the casing was being formed. When a convenient length of the casing had been formed with the plastics tube disposed within it, the casing and tube were cut and the tube inflated as before.

In yet a further embodiment of the invention again illustrating the use of an inflatable plastics tube as a templet, the tube was everted and hence "blown" into the interior of the casing and the tube subsequently inflated and sealed; this technique is further illustrated in Example 4.

Figure 2:
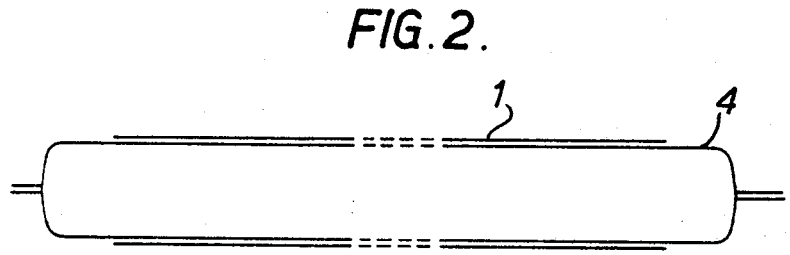
Figure 3:
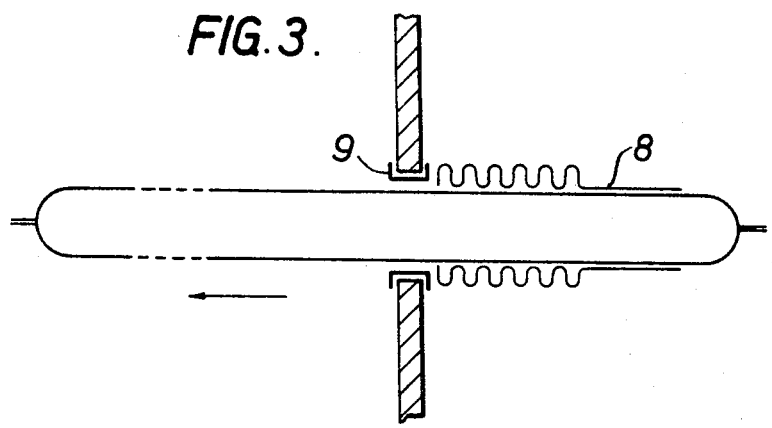
Figure 4:
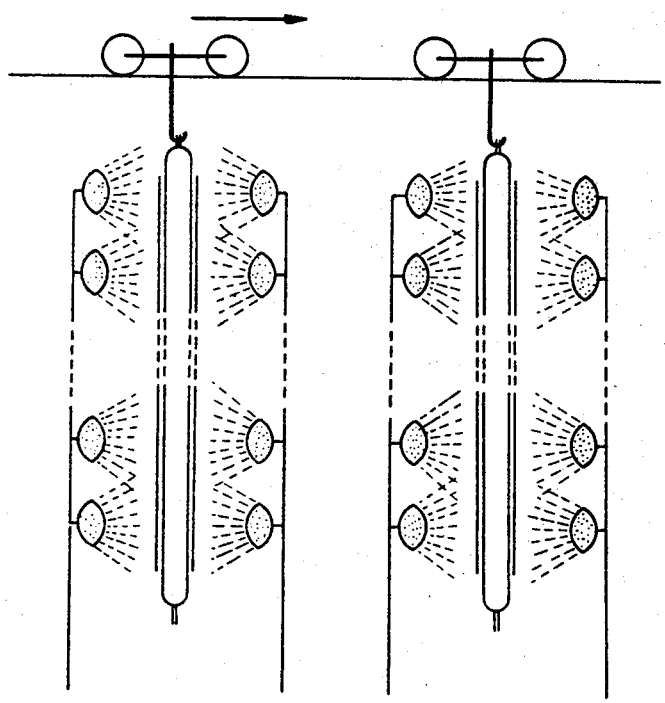
Figure 5:
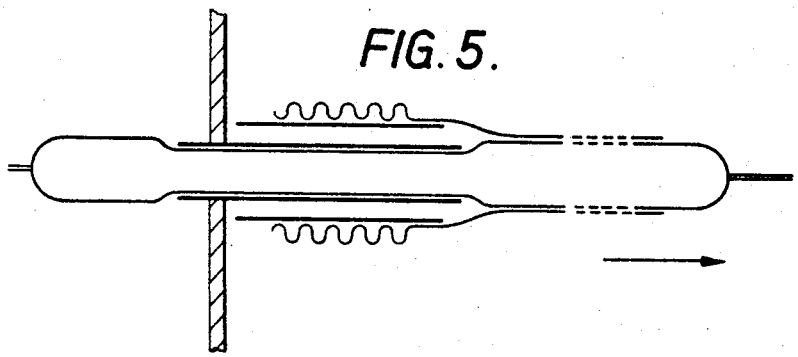
Figure 6:
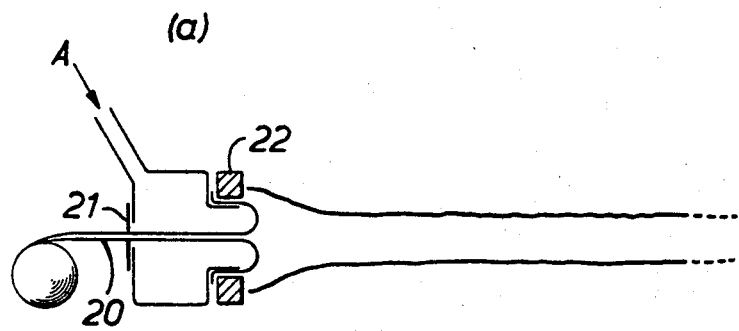
Figure 6:
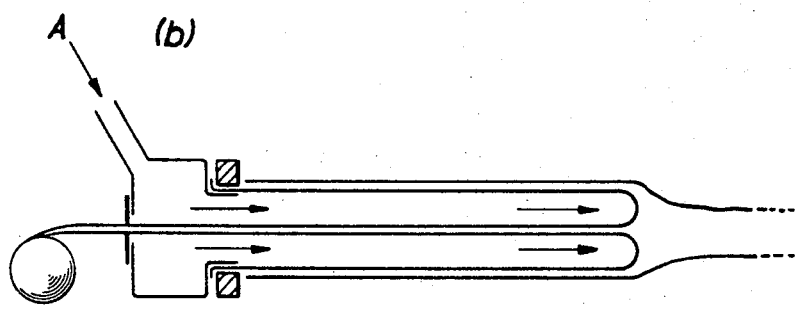
Figure 6:
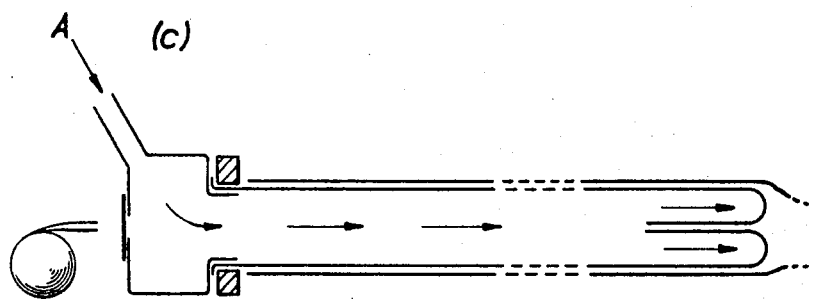

In the following examples, reference is made to the accompanying diagrammatic drawings, of which:

FIGURES 1, 5 and 6 are diagrammatic representations of methods of disposing a casing on a templet, FIGURE 2 is a diagrammatic section of the casing disposed on the templet by the methods to be described in the examples, FIGURE 3 is a diagrammatic representation of a method of shirring dried casing direct from the templet, FIGURE 4 is a diagrammatic representation showing the spraying or washing of casings disposed on templets.

All the figures are diagrammatic longitudinal sections of the apparatus, casing and templet.

*Example 1*

As shown diagrammatically in FIGURE 1, a length of wet sheep gut sausage casing 1 (about 8 m. long) was shirred by hand onto a polytetrafluorethylene tube 2 of 1.2 cm. external diameter and 0.8 cm. internal diameter. The length of the wet shirred casing was about 30 cm.

The polytetrafluorethylene tube was carried on a metal tube 3, through the bore of which passed a length of nylon tubing 4 which was folded lengthwise so that it could pass through the narrow bore of the metal tube. The nylon tube was supplied as required from a roll of the material 6. The size of the nylon tube was such that upon inflation its diameter was about the same as that of the casing being treated. The metal tube was supported in a carrier 5 made of wood.

To dispose the casing on the nylon tube, both the casing and tube were drawn out at the same rate (towards the right in FIGURE 1) until all the casing was extended evenly. The end of the nylon tube distant from the roll was then heat sealed and, after cutting the nylon tube so that about 60 cm. of it extended from the end of the casing near to the roll, the tube was inflated by air (pressure of about 0.35 kg./cm.$^2$ gauge) until it was fully inflated. The open end of the nylon tube was then heat sealed.

FIGURE 2 illustrates the casing 1 disposed on the inflated and sealed nylon tube 4.

The supported casing was then suspended from a rack and allowed to dry in a drying room at a temperature of about 20° C. Drying took about 15 minutes and the resulting dry casing had a wall thickness of about 0.0025 to 0.005 mm., and a remarkably even diameter.

The dried casing 8 was shirred (see FIGURE 3) by passing the inflated nylon tube through an aperture lined with a rubber grommet 9, which was just too small to allow passage of the casing also. Consequently as the nylon tube was pulled through the aperture the casing was shirred, and eventually removed entirely from the nylon tube. The resulting casing was as tightly shirred as conventionally shirred products.

*Example 2*

A manufactured sausage casing (obtained by the process of applicants' co-pending U.S.A. patent application No. 463,021) was disposed onto an inflated nylon tube as described in Example 1. The supported wet casing was suspended from a carriage way by which it could be transported through a succession of processing chambers. FIGURE 4 is a diagrammatic representation showing casings disposed on templets passing through a spray washing area after processing. The casing was dried at a temperature of 30° C., washed to remove excess precipitating material (this step is only required when such material is present, of course) and then dried again to the moisture content required. The dried casing was then shirred as before.

*Example 3*

Manufactured sausage casing was wet shirred onto a polytetrafluorethylene tube as described in Example 1.

A length of nylon tubing about 9 m. long was heat sealed near to one end and, after inflating to a pressure at which it would retain its shape but could be compressed for a short proportion of its length quite easily, it was sealed about 60 cm. from the other end (see FIGURE 5).

The uninflated end of the nylon tube was passed through the metal tube as in Example 1. By pulling on the uninflated end of the tube the inflated portion could be drawn through the metal tube, and the casing pulled onto it at an appropriate rate, so that it was eventually fully extended. Further processing was then carried out as described in Example 2 and the dried casing shirred direct from the inflated nylon tube which was then reused many times without deflation and re-inflation.

*Example 4*

As shown diagrammatically in FIGURE 6, the end of a length of folded nylon 20 tubing was fed through an air-tight valve 21 and the end held securely by a push-on rubber lined washer 22 (see FIGURE 6(a)). A length of wet casing was held so that when air was pumped at a pressure of about 0.35 kg./cm.$^2$ gauge into the nylon tube, (in FIGURE 6 the path taken by the air is indicated by arrow "A") the tube was forced into the casing (see FIGURE 6(b)). When just over half its length had been introduced into the casing, the nylon tube was cut from the roll and the severed end blown through the casing as shown in FIGURE 6(c). The nylon tube enclosed within the casing was then inflated and sealed as already described.

*Example 5*

The procedure of Example 3 was repeated except that 8 m. of casing was disposed around 9 m. of nylon tube which had previously been inflated to about 90% of the maximum pressure required to fully inflate the tube. The protruding 1 m. of nylon tube was then rolled and clipped to compress the air in the remaining 8 m. of tube and to inflate the tube to the correct diameter for supporting the casing during subsequent processing.

What is claimed is:

1. A process for treating a flexible tubular casing, which process comprises the steps of disposing the casing on a templet, subjecting the casing to a drying treatment while disposed on the templet and shirring the casing when dried from the templet.

2. A process according to claim 1, in which the casing when dried is shirred from the templet by feeding the templet through an aperture of dimension sufficient to allow passage of the templet, but insufficient to allow passage of the casing disposed thereon, and thereby shirring the casing at one side of the aperture by passage of the templet through said aperture.

3. A process according to claim 1, in which the casing is subjected to the drying treatment while disposed on a templet having the form of an inflated tube, and the casing is subsequently shirred by passing the inflated tube through an aperture having a diameter smaller than that of the inflated tube, the tube being transversely compressed during its passage through said aperture.

References Cited

UNITED STATES PATENTS

| | | | |
|---|---|---|---|
| 2,127,466 | 8/1938 | Reichel et al. | 34—21 |
| 2,257,222 | 9/1941 | Bergmann | 34—21 X |

JOHN J. CAMBY, *Acting Primary Examiner.*